United States Patent [19]

Waber

[11] Patent Number: 4,497,019

[45] Date of Patent: Jan. 29, 1985

[54] PROGRAMMABLE CONTROL SYSTEM FOR CONTROLLING AT LEAST TWO PARAMETERS IN A PREDETERMINED SEQUENCE USING BOTH ANALOG AND DIGITAL CONTROL SIGNALS

[75] Inventor: Glenn R. Waber, St. Paul, Minn.

[73] Assignee: GNB Batteries Inc., Mendota Heights, Minn.

[21] Appl. No.: 378,958

[22] Filed: May 17, 1982

Related U.S. Application Data

[63] Continuation-in-part of Ser. No. 245,772, Mar. 20, 1981.

[51] Int. Cl.³ ............... G06F 15/16; G05B 19/417
[52] U.S. Cl. ............... 364/132; 364/133; 364/134; 364/171; 219/125.1; 219/61.5; 219/91.1
[58] Field of Search ............. 364/131, 132, 133, 134, 364/171, 474, 200 MS File, 900 MS File; 219/125.1, 61.5, 91.1

[56] References Cited

U.S. PATENT DOCUMENTS

| | | | |
|---|---|---|---|
| 4,068,297 | 1/1978 | Komiya | 364/474 X |
| 4,262,336 | 4/1981 | Pritchard | 364/132 X |
| 4,281,379 | 7/1981 | Austin | 364/132 |
| 4,288,849 | 9/1981 | Yoshida et al. | 364/132 |
| 4,354,262 | 10/1982 | Guézou et al. | 364/200 MS X |
| 4,380,696 | 4/1983 | Masaki | 219/125.1 X |

*Primary Examiner*—Jerry Smith
*Assistant Examiner*—Allen MacDonald
*Attorney, Agent, or Firm*—Augustus J. Hipp; Dennis R. Schlemmer

[57] ABSTRACT

A method and apparatus for controlling a work function, such as, for example, welding, requiring the control of at least one parameter according to a predetermined sequence, the apparatus including at least one work station where the work function is carried out, a slave controller associated with the work station for controlling the work function, at least one interface operably connected to the slave controller capable of receiving and storing information for a first parameter of the work function and preventing transmission of the parameter information to the slave controller until being probed by the slave controller, and a master controller operably connected to the interface to transmit thereto the parameter information, and the master controller being further operably connected to the slave controller to cause the slave controller to probe the interface to allow transmission of the parameter information to the slave controller. In one embodiment, the information for a second parameter is transmitted from the master controller to the control portion of the slave controller so that such parameter information can be modified, if desired, while the work function is being carried out.

14 Claims, 26 Drawing Figures

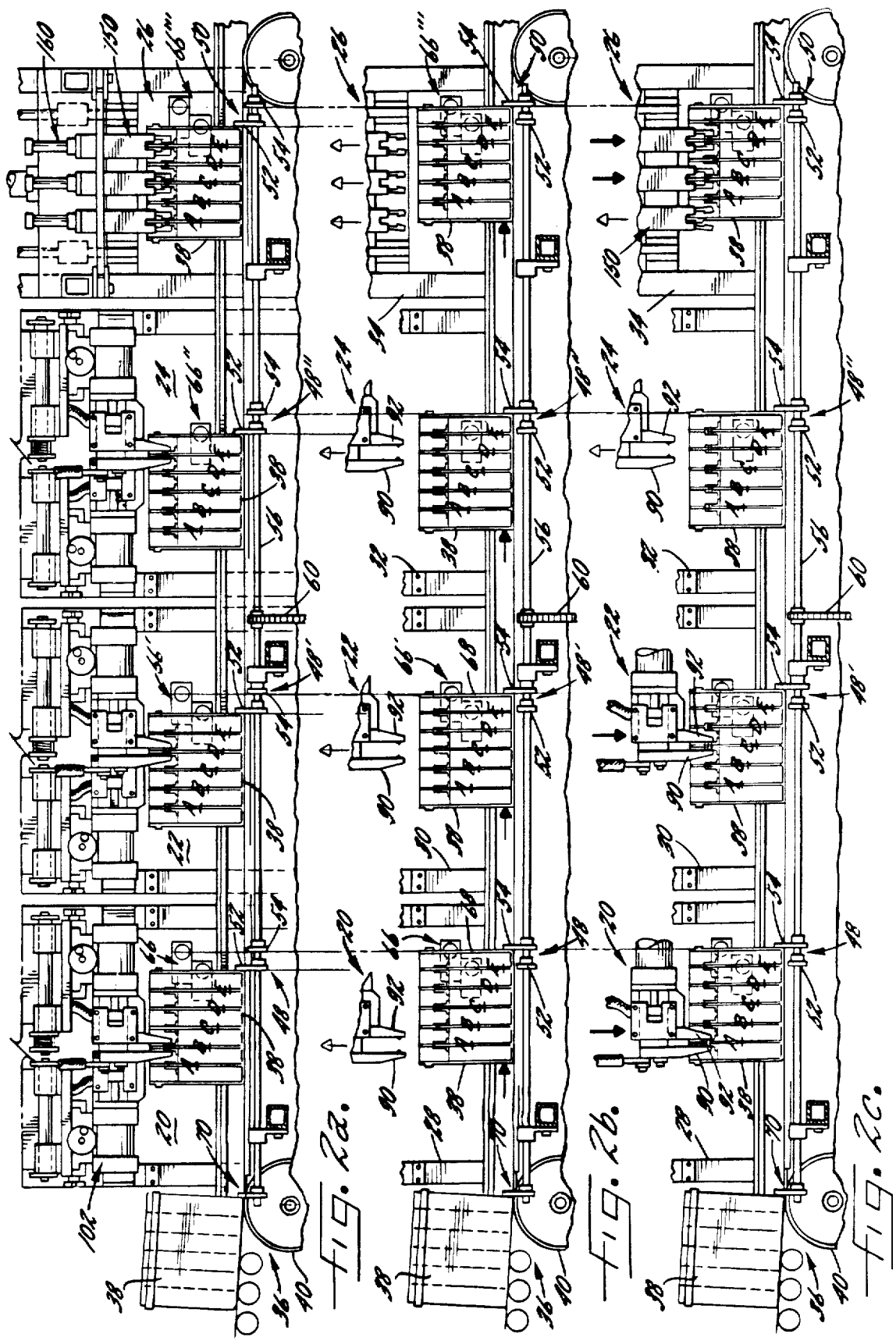

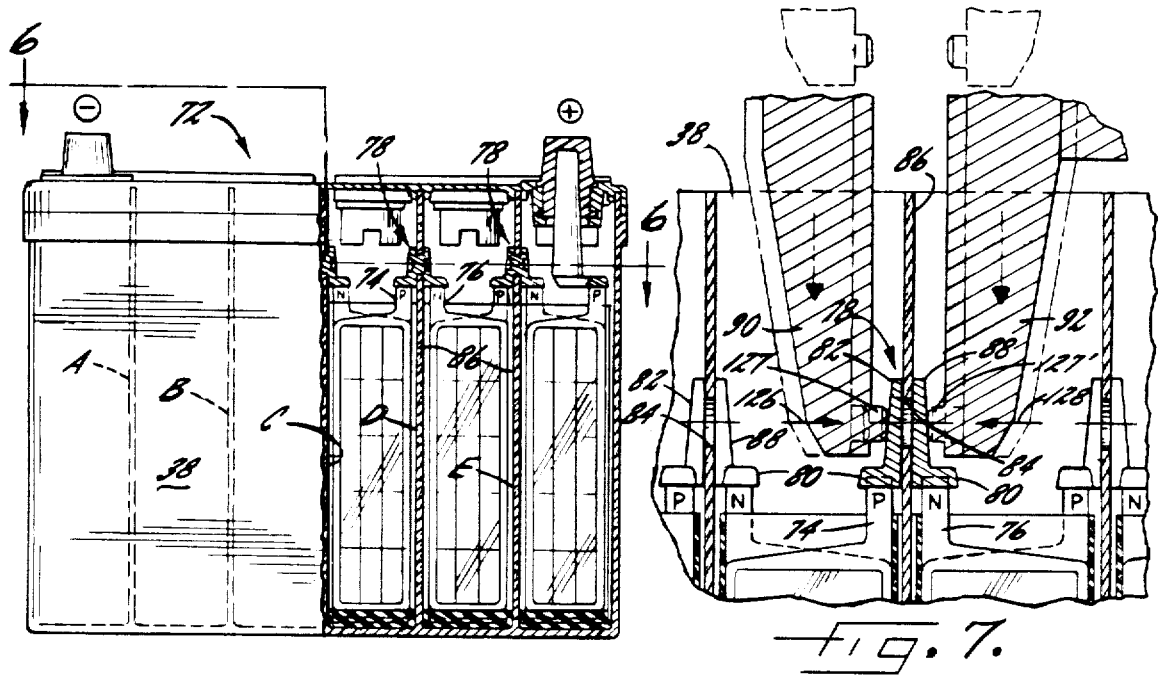
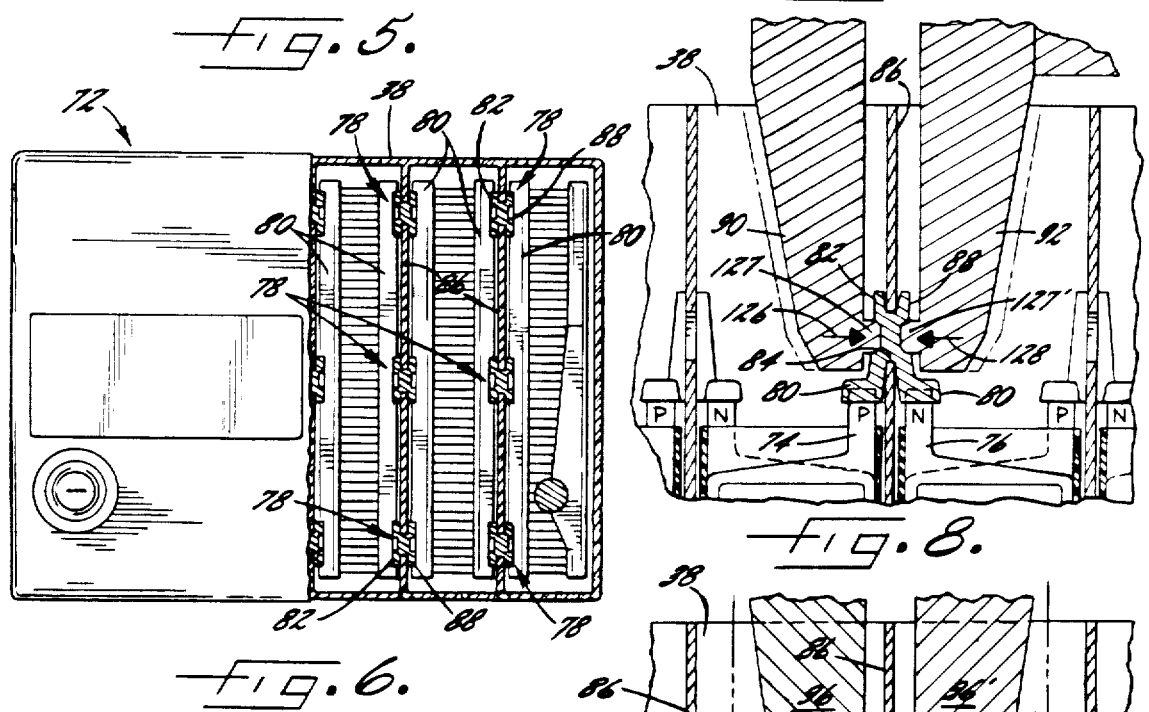
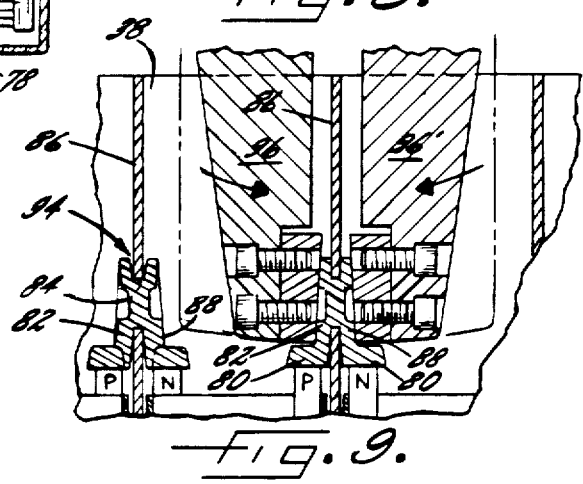

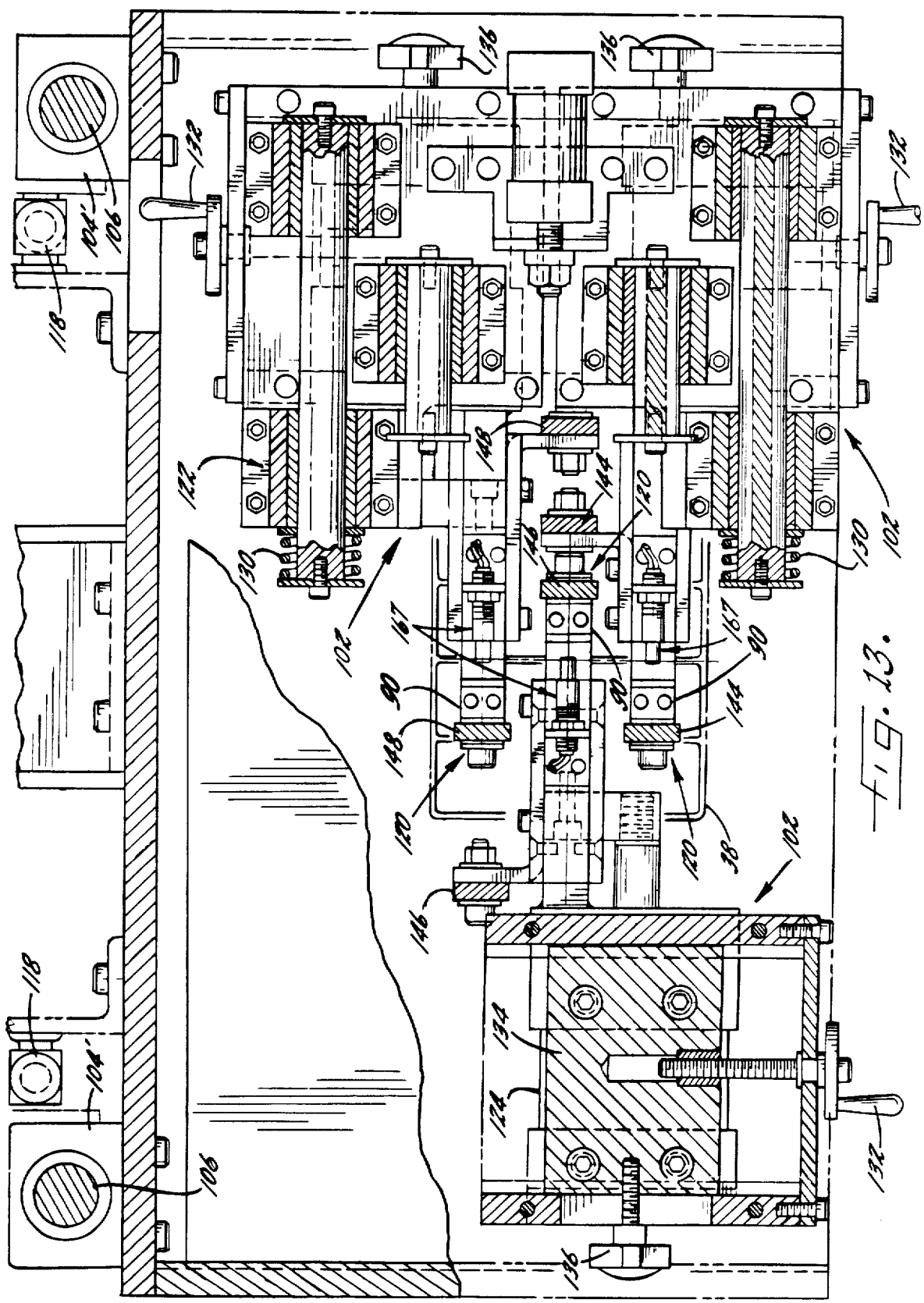

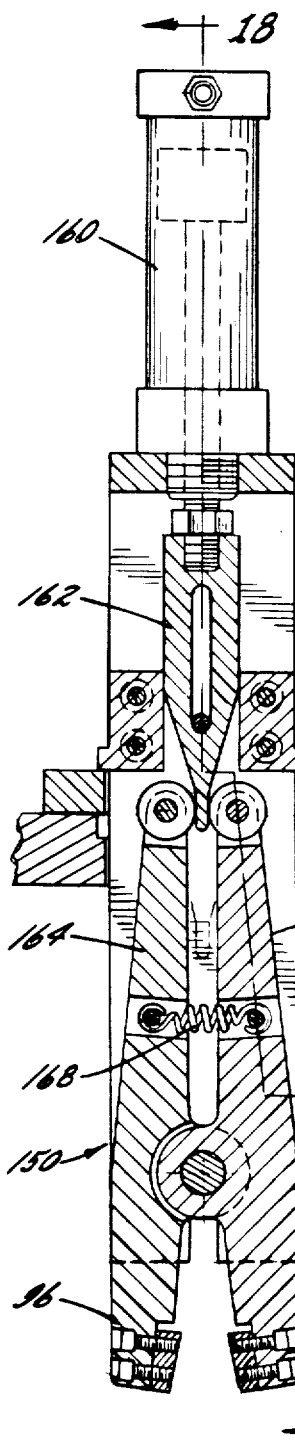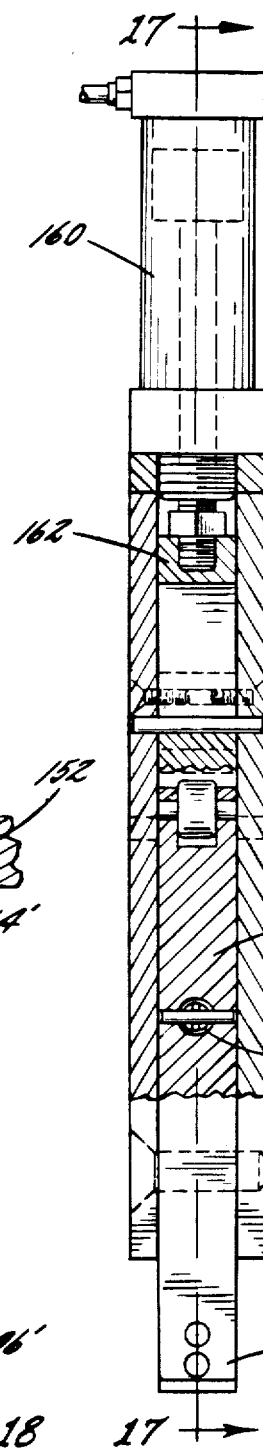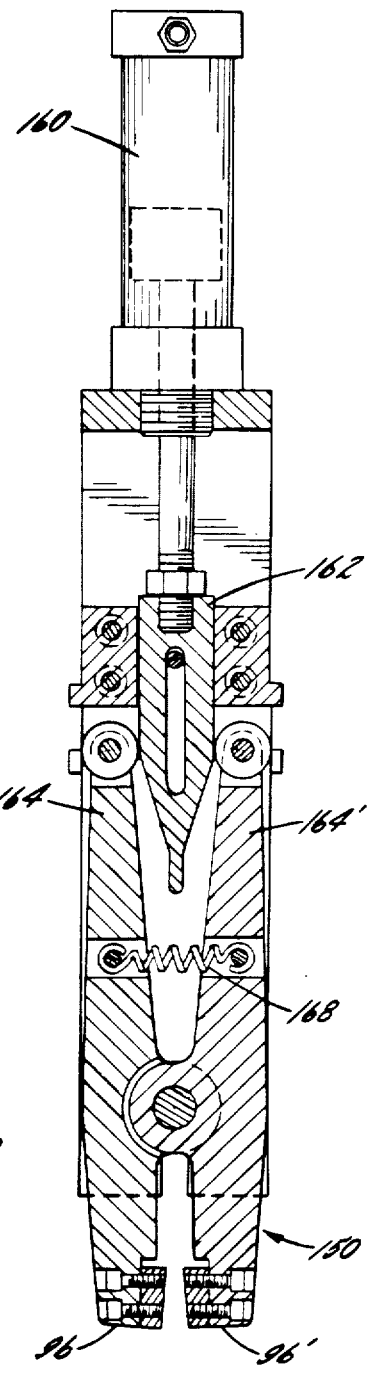

PROGRAMMABLE CONTROL SYSTEM FOR CONTROLLING AT LEAST TWO PARAMETERS IN A PREDETERMINED SEQUENCE USING BOTH ANALOG AND DIGITAL CONTROL SIGNALS

RELATED APPLICATIONS

Klang and Rao, U.S. Ser. No. 352,924, filed Feb. 26, 1982, for: Lead-Acid Battery And Method of Making Same; a continuation-in-part of U.S. Ser. No. 245,772, filed Mar. 20, 1981.

Orlando, Lund and Waber, U.S. Ser. No. 378,277, filed May 14, 1982, for: Means for Welding Intercell Connections.

BACKGROUND OF THE INVENTION

The present invention relates to a control system, and, more particularly, to a microprocessor-based system for controlling work functions.

There are many work functions carried out that require control according to a predetermined sequence of one or more operating parameters. For example, welding apparatus for various applications is conventionally designed to effect a particular welding sequence by controlling the time of the weld (generally in terms of the number of cycles) and the current level applied (generally in terms of the percent of the maximum available current that can be provided). And, microprocessor-based controllers have been developed that are particularly tailored to control such work functions.

Further, there are applications which require multiple work functions to be controlled in accordance with the predetermined sequence at one, and, often, multiple work stations. And, control systems have been developed which include a master controller programmed to control the overall desired sequence and one or more slave control systems to carry out such work functions in response to the predetermined sequence provided by the master controller.

Unfortunately, as far as is known, while programmable controllers suitable to serve as the master controller are commercially available, such master-slave control systems require the development of slave controllers tailored to the specific work function being controlled. More particularly, for many work functions such as, for example, welding, available controllers are simply not designed to function as slave controllers. Such controllers can thus not be readily used in master-slave control systems. Stated another way, while such commercially available controllers can satisfactorily control a particular work function such as welding, such units cannot be readily utilized with a master controller due to incompatability.

The expense in developing suitable slave controllers tailored to a particular work function can be considerable, as can be the time involved. Moreover, designing a suitable slave controller tailored to a particular work function may not be all that productive unless the application is of sufficient importance to justify the time and expense required.

There is accordingly a need for a master-slave control system capable of controlling work functions which is capable of utilizing available controllers not designed to function as slave controllers. Such a system would obviate the time and expense associated with developing such controllers by allowing utilization of commercially available controllers.

SUMMARY OF THE INVENTION

A principal object of the present invention is to provide a master-slave control system for effecting work functions in accordance with a predetermined sequence which utilizes as a slave controller a control apparatus not designed to function as such.

A further object provides such a control system which is capable of controlling work functions involving multiple parameters.

Yet another object lies in the provision of such a control system which utilizes a parallel signal path for sending instructions to the slave controller or controllers. A more specific object is to provide such a master-slave control system characterized by the ability to modify one of the parameters being controlled while the work function is being carried out.

Other objects and advantages will be apparent from the accompanying drawings, showing the utilization of the present invention in conjunction with the control of the multiple station intercell welding apparatus described in the co-pending Orlando et al application referred to herein, in which:

DESCRIPTION OF THE DRAWINGS

FIGS. 2a through 2c are partial side elevation views of the apparatus and show the welding and crimping operations which take place at the two positions of each station;

FIG. 5 is a side elevation view of an assembled battery, the container being partially cut away to show the completed through-the-partition intercell connections;

FIG. 6 is a cross-sectional view taken generally along the line 6—6 of FIG. 5 and further illustrates the multiple intercell connections made;

FIG. 7 is a side elevation view of a portion of one pair of the welding electrodes and showing the electrodes in position prior to initiation of the welding operation;

FIG. 8 is a side elevation view similar to FIG. 7 and showing the electrodes in their final position at the completion of the welding operation;

FIG. 9 is a view similar to FIGS. 7 and 8, except showing a portion of the crimper heads;

FIG. 13 is a cross-sectional view taken generally along the line 13—13 of FIG. 12 and illustrating the means for adjusting the location of the welding electrodes;

FIG. 14 is a cross-sectional view taken generally along the line 14—14 of FIG. 12 and showing the electrical connections for the welding electrodes;

FIG. 17 is a cross-sectional view taken generally along the line 17—17 of FIG. 18 and illustrating a pair of crimper heads in an open position;

FIG. 18 is a cross-sectional view taken generally along the line 18—18 of FIG. 17 and further showing the crimper heads;

FIG. 19 is a cross-sectional view similar to FIG. 17, except showing the crimper heads in their closed position.

Figure 1:
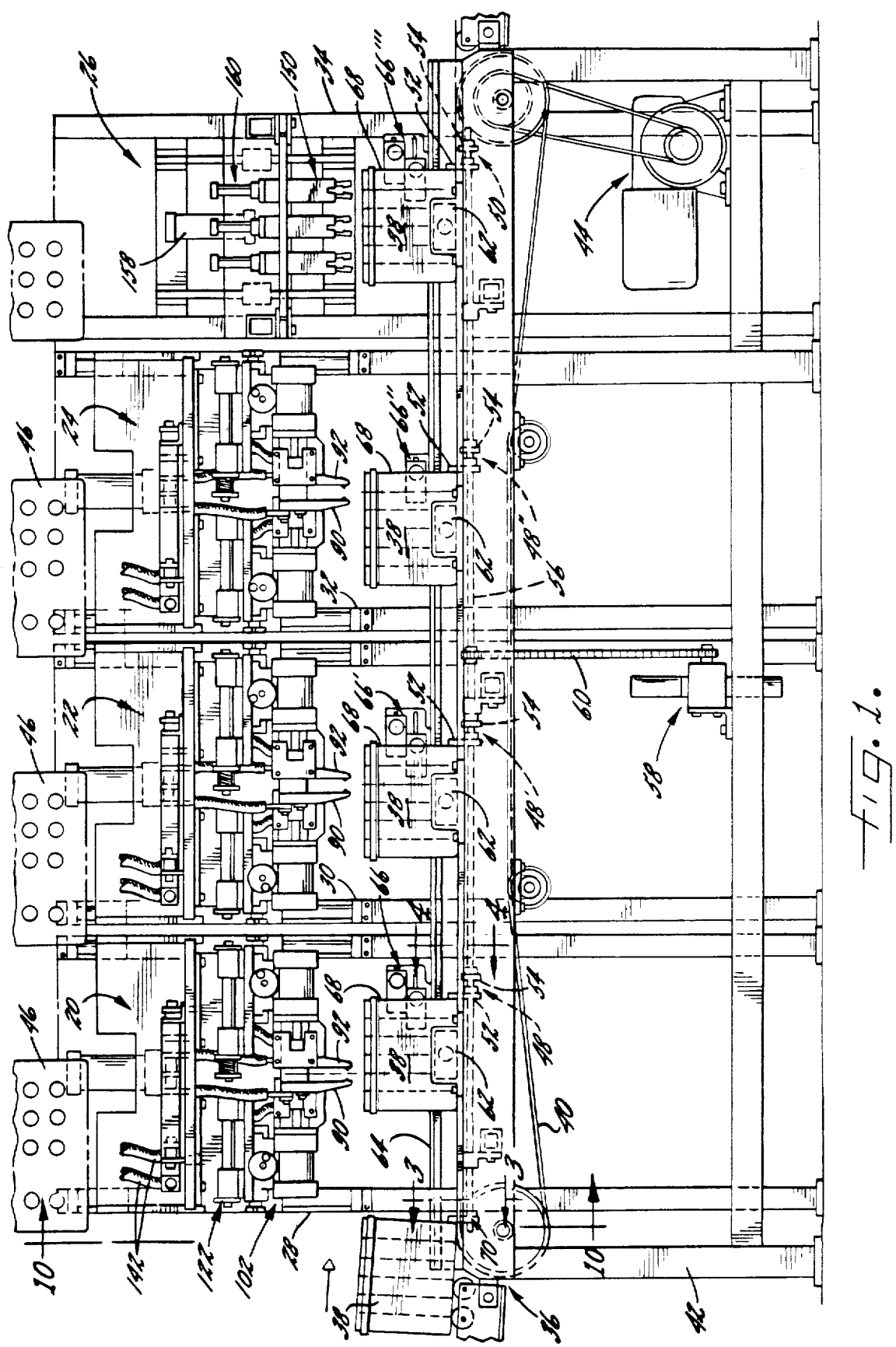
FIG. 1 is a side elevation of an exemplary embodiment of the intercell welding apparatus and illustrating the respective welding and crimping stations.

While the invention will be described in connection with preferred embodiments, it will be understood that I do not intend to limit the invention to these preferred embodiments. On the contrary, I intend to cover all alternatives, modifications, and equivalents as may be included within the spirit and scope of the present invention as defined in the appended claims. Thus, while the present invention will be described in conjunction with a system for controlling a multiple station intercell welding apparatus for battery containers, it should be appreciated that the control system of this invention may be advantageously employed to control any other work function. This invention is most advantageously employed in applications where a controller capable of controlling a specific work function but incapable of serving as a slave control is commercially available.

In general, the present invention provides a master-slave control system for controlling a work function which includes a microprocessor-based programmable controller serving as a master control means and at least one slave controller capable of controlling a particular work function but, as designed, incapable of serving as a slave controller. Pursuant to the present invention, compatability is provided by the inclusion of interface means capable of accepting parameter information from the master control means and allowing such information to be transmitted to the slave controller upon probing by such slave controller in response to instructions from such master control means. In this fashion, while not designed to function as a slave controller, the inclusion of the interface means allows the controller to serve this function. Other features of the present invention will be described in conjunction with the illustrative embodiment in the following detailed description.

DETAILED DESCRIPTION

Turning now to the drawings, there is shown an illustrative embodiment of the master-control system of this invention used to control the intercell welding apparatus shown in the co-pending Orlando et al application. In this illustrative embodiment, there are three welding stations, which will be identified as welding station No. 1, shown generally at 20, welding station No. 2, shown generally at 22, welding station No. 3, shown generally at 24 and a crimping station, shown generally at 26. Each of these four stations have a frame means for mounting the necessary welding or crimping apparatus. Thus, upstanding frames 28, 30 and 32, respectively, carry the necessary welding apparatus for weld stations 1, 2 and 3. Upstanding frame 34 carries the necessary crimping means for crimper station 26.

Conveying means shown generally at 36 are utilized to transport the battery containers into and through the various stations. As shown, the containers 38 are transported through the apparatus by conveyor 40, mounted on frame 42, and driven by conventional motor 44 through appropriate gearing. Operation of the conveyor motor 44 is controlled by the master controller (FIG. 20), being connected thereto by conventional machine connections.

Each welding station includes a slave control means which operates in response to the master control means to carry out the welding operation as will be described later. Such slave control means are shown generally at 46. In accordance with one aspect of the present invention, the slave control utilized is a commercially available controller designed to control the particular work function, but incapable of use directly with a master controller.

The master control means likewise regulates operation of the crimper station 26. Such control means may be connected to the crimper station through standard machine connections.

The battery containers are positioned at the appropriate location in each station by aligning and retaining means. Such means both accurately align the container so that the welding or crimping function can be satisfactorily carried out as well as positively clamping or retaining the container in such proper position while the welding or crimping is being carried out. Travel through the apparatus in what may be termed the machine direction ceases when the container reaches stop means, shown generally at 48, 48' and 48" in welding stations 1 through 3 respectively and at 50 in crimper station 26. As will be described hereinafter, the stop means each comprise cams 52 and 54 mounted on shaft 56. The shaft 56 is rotated by a conventional pneumatically controlled rotary air actuator system shown generally at 58 via chain 60 in response to the master control means as will be more fully discussed hereinafter.

The aligning and retaining means also provide positioning of the containers relative to the welding heads in the direction transverse to the machine direction. To this end, transverse positioning means shown generally at 62 are located at each station to position containers 38 against guide rail 64. Positioning means 62 are actuated by the master control means and maintain positive contact with the container until the welding or crimping operation is complete. Each container is thus effectively held in position on three sides, as can be seen more clearly in FIG. 10, thus obviating any undesired movement during the welding or crimping operation.

To prevent damage to the container, the welding heads or the apparatus itself, sensing means are provided at each station for determining the presence of a battery container in its proper location. As shown in FIG. 1, photoeyes 66, 66', 66", 66''' are positioned at welding stations 1 through 3 and crimper station 26, respectively, to sense the leading edge 68 of the container 38 as well as the proximity to the photoeye. The photoeyes 66 through 66''' signal the master control means, identifying whether the particular container is in its proper location or not relative to both the stop means and the guide rail. Sensing means utilizing electromagnetic radiation are known and may be employed. Particularly useful are conventional convergent beam photoelectric scanners.

Entry means are also provided to regulate entry of containers into the first welding station 20. To this end, cam stop means 70 is mounted on shaft 56 and is operated in concert with stop means 48-48'' and 50 for the respective welding and crimping stations. The particular sequencing will be further described in conjunction with FIGS. 2a through 2c.

FIGS. 2a through 2c show the welding and crimping sequence which takes place at each station. For ease of description, the cell partitions of each container 38 have been designated A through E, starting with the trailing end of the container. As illustrated in FIG. 2a, the through-the-partition welds in cell partitions B, D and E are made in the initial position at welding stations 20, 22 and 24, respectively while at crimper station 26 the intercell welds in cell partitions A, C and E are crimped.

After the welding and crimping heads are retracted, the containers are then indexed in the machine direction (shown by the arrow) about the width of one cell to the second and final position at each station, as is schematically shown in FIG. 2b. In this position, proper machine direction alignment of the containers 38 is obtained by the respective second cam stops 54 at the various stations, the initial cam stops 52 having been rotated from their operative position shown in FIG. 2a to a position allowing the battery containers to be conveyed to the second position shown in FIG. 2b.

FIG. 2c illustrates the welding and crimping operations carried out in this second position. As shown, the intercell welds in partitions A and C are effected at welding stations 20 and 22, respectively. The welding heads at welding station 24 remain in their retracted position since the intercell welds in partition D were previously made at welding station 22 in the initial position, as seen in FIG. 2a. The necessary crimping function for the intercell welds in cell partitions B and D are likewise effected as illustrated.

The next step in the sequence involves the movement of the battery containers to the next downstream station. At this same time, the battery container exiting crimper station 26 has had the necessary intercell connections made and may be further processed in subsequent assembly steps, such as the application of the cover to the container. Rotation of the entry stop means allows a new container to enter the initial welding station 20.

Considering the sequencing of a single container as it proceeds through the apparatus, the intercell welds in partition B are made in the first position of weld station 20 (FIG. 2a). The container is then indexed to the second position (FIG. 2c) where the intercell connections through partition A are made. The container is then conveyed to the weld station 22 where at the first position (FIG. 2a) the welds in partition D are made and, at the second position (FIG. 2c), the intercell connections through partition C are effected. After being conveyed to weld station 24, the intercell connections through partition E are effected at the first position (FIG. 2a). No welding operation occurs at the second position of weld station 24 (FIG. 2c), as the intercell connections in partition D were effected previously. The container is then conveyed to crimper station 26 where the welds through partitions A, C and E are crimped at the first position (FIG. 2a). After indexing to the second position (FIG. 2c), the welds through partitions B and D are crimped. The thus-welded battery may then be subjected to further processing as required.

Figure 3A:
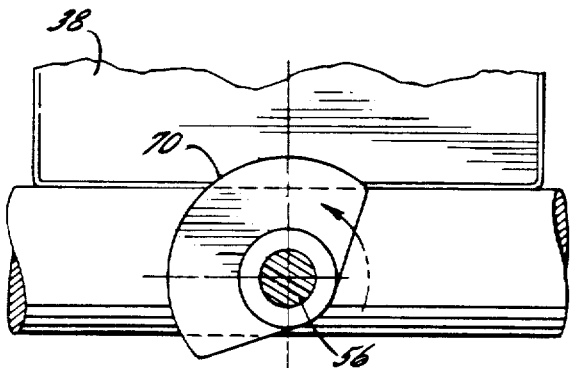
FIGS. 3a through 3c are cross-sectional views taken generally along the line 3—3 of FIG. 1, showing various positions of the stop means which regulates entry of a battery container into the first welding station.
Figure 4A:
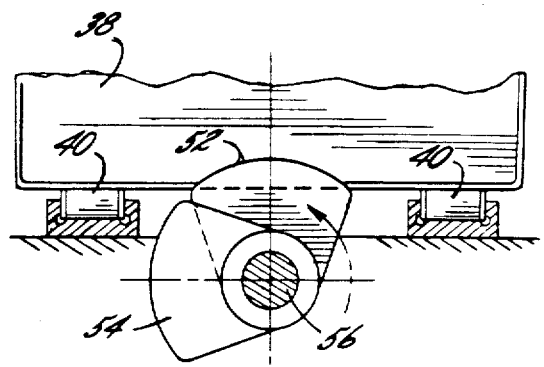
FIGS. 4a through 4c are cross-sectional views taken generally along the line 4—4 of FIG. 1 and illustrate various positions of the stop means which aid in properly locating the battery containers in the two positions of the respective welding and crimping stations.
Figure 3B:
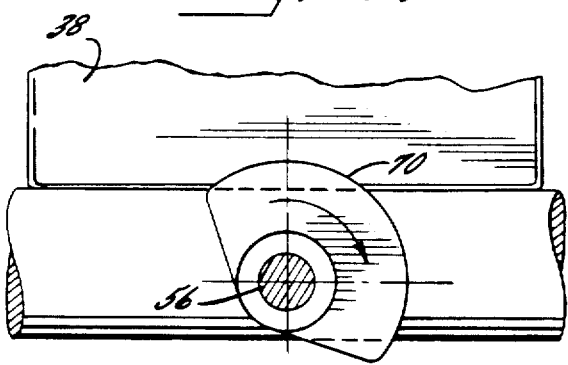
Figure 4B:
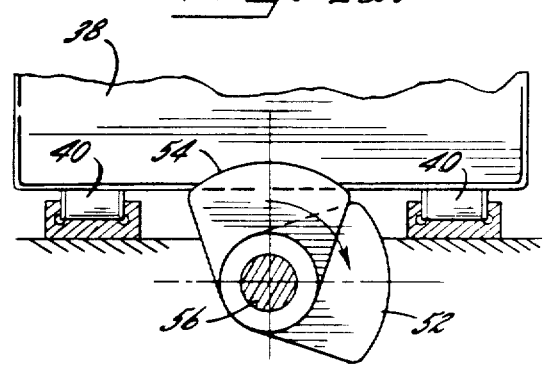
Figure 3C:
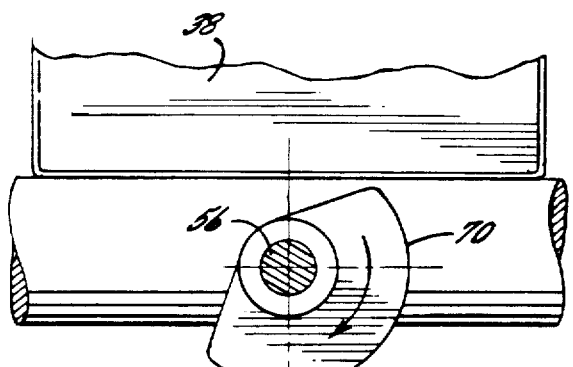
Figure 4C:
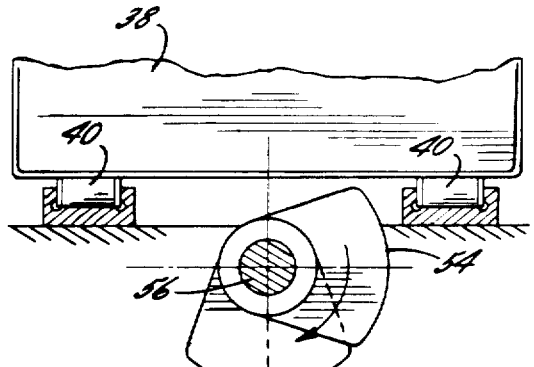

FIGS. 3a through 3c show the sequencing of the entry stop means 70 which regulates entry of containers into the initial welding station 20 while FIGS. 4a through 4c show the stop means operative at the respective welding and crimping stations. Only one set of stop means is shown in FIGS. 4a-4c for simplicity since this aspect of the operation is the same at each station.

FIG. 3a shows entry stop means 70 in position restricting entry of container in the initial welding station 20; and FIG. 3b shows the entry stop means 70 having been further rotated, as will occur when the battery containers are indexed to the second position at each station, yet still preventing entry of a container into the welding station 20. FIG. 3c shows the entry stop means 70 rotated into an inoperative position to allow the next container to enter welding station 20.

As noted previously, FIGS. 4a through 4c show the sequencing of the stop means at each of the three welding stations and the crimper station. FIG. 4a thus illustrates the cam stop 52 retaining the container in the initial position while cam stop 54 is in an inoperative position, and FIG. 4b shows cam stop 54 have been rotated into operative position while cam stop 52 has been rotated to an inoperative position so as to allow the container to move from the first to the second position in each station. FIG. 4c shows cam stops 52 and 54 both rotated to an inoperative position to allow the container to be conveyed to the next station. The next sequence returns entry stop means 70 to the position shown in FIG. 3a and the stop means 52 and 54 to return to the positions shown in FIG. 4a.

FIGS. 5 and 6 show an illustrative embodiment of a completed battery having had the intercell connections made and the cover assembled. The battery shown generally at 72 has the configuration of the battery described and illustrated in the Klang et al. application. Positive plates 74 have thus been electrically connected to negative plates 76 in the adjoining cell through multiple, through-the-partition connections, as shown generally at 78. Straps 80 electrically connect in parallel plates of the like polarity in a given cell.

FIGS. 7 through 9 illustrate the welding and crimping functions which take place in the illustrated apparatus. As shown, the strap 80 for the positive plates 74 has a plurality of spaced upstanding lugs or tombstones 82 positioned adjacent a plurality of like-spaced apertures 84 in cell partition 86. Similarly, negative plates 76 are electrically connected in parallel by strap 80, which has a plurality of spaced upstanding lugs 88 positioned adjacent the corresponding apertures in the face of cell partition 86 opposite to that to which positive lugs 82 abut. In FIG. 7, an illustrative welding head having welding means in the form of a pair of electrode heads 90 and 92 have been moved into position adjacent lugs 82 and 88, respectively, to initiate the welding or fusion operation. FIG. 8 shows electrodes 90 and 92 at the relative position assumed when the welding or fusion operation has been completed. As can be seen, portions of the lugs 82 and 88 have been displaced from their initial position into aperture 84, effectively filling the aperture.

There is some tendency for the lugs following the welding operation to slightly recede from contact with the partition, as can be generally seen at 94 in FIG. 9. Accordingly, while not an essential operation, it is considered generally desirable to mechanically crimp the welded, intercell connections to again position the lugs solidly against the partition wall. This is accomplished, as shown in FIG. 9, by inward movement of crimper heads 96 and 96', as will be more fully described hereinafter.

Figure 10:
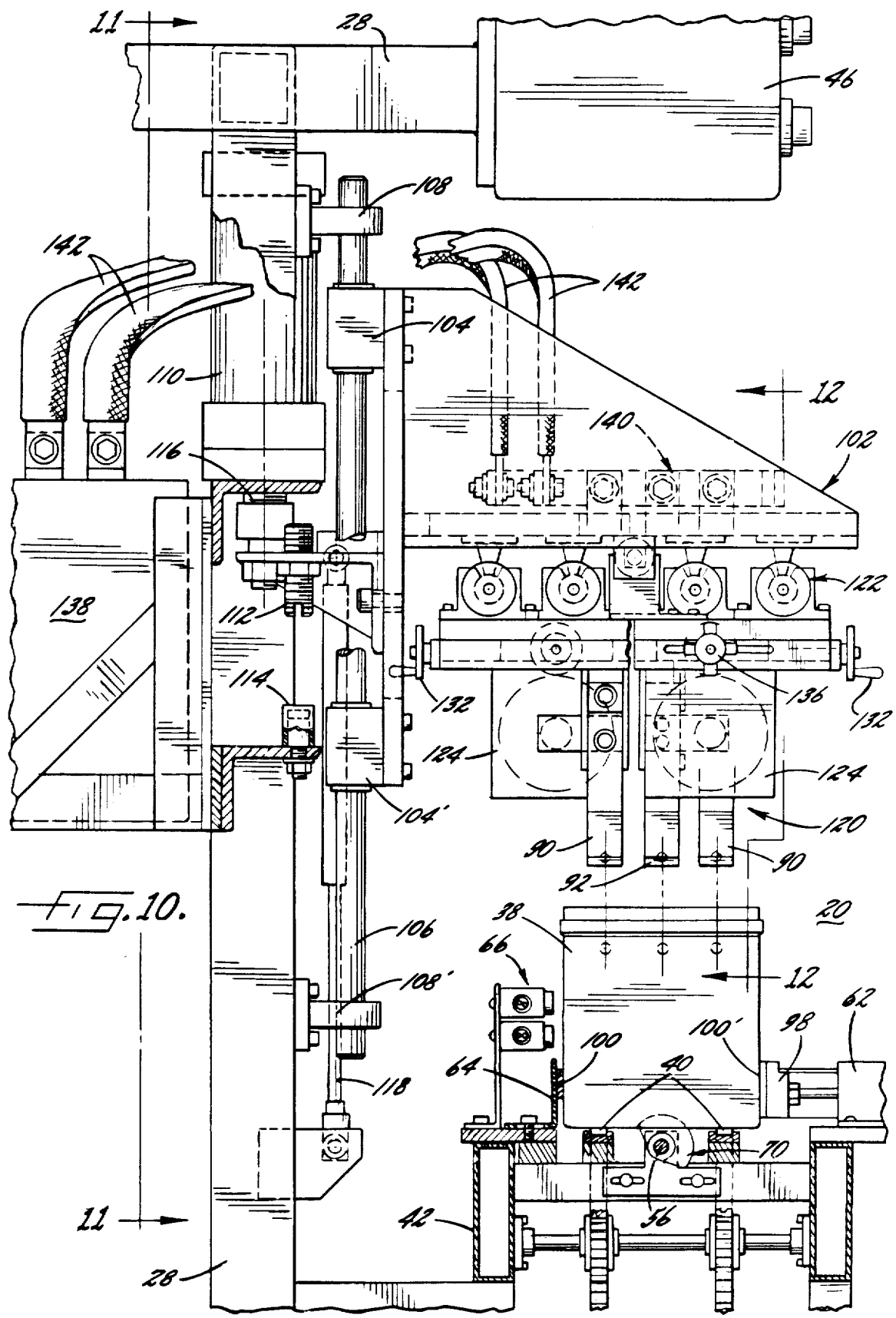
FIG. 10 is an end elevation view from the entry end of the illustrative apparatus and showing the means for sensing whether the battery container is in the desired location, the means for aligning the battery container and the apparatus at this welding station.

Before turning to the description of the illustrative means for carrying out the intercell welding, FIG. 10 further illustrates the functioning of the aligning and retaining means maintaining a battery container in position for the welding operation. Once the battery container has reached cam stop means 48, the master control means, connected by conventional machine connections to positioning means 62, actuates positioning means 62, causing a pusher arm 98 to extend, retaining the container 38 between the pusher arm 98 and against the guide rail 64. Both the pusher arm and the guide rail may be suitably padded, as shown at 100, 100', to minimize any marring or the like of the container.

As has been previously referred to, one embodiment of the battery set forth in the Klang et al. application may utilize considerably less top lead than generally used in conventional SLI batteries. A consequence is that the size of the cell apertures and that of the lugs may be much smaller than those employed in conventional SLI batteries. For example, a suitable cell aperture for a Klang et al. battery may be only about 9/32 inch in diameter or so with the lug having a thickness adjacent the strap of about 0.140 inch tapering to a thickness of about 0.10 inch at the top of the lug. With the cell apertures being smaller, the height and width of the lugs are correspondingly smaller in dimension, providing just enough material to fill each aperture after welding as well as to sufficiently overlie the aperture as is shown in the drawings. It has been found that the welding conditions necessary to provide satisfactory intercell welds with such smaller lugs are more sensitive than the conditions needed when making intercell welds in conventional SLI batteries.

Accordingly, when such smaller lugs and apertures are being utilized in the batteries being processed, welding conditions are employed which allow consistently satisfactory welds to be obtained under such relatively sensitive conditions. To this end, the welding electrodes are designed so that the electrode tips which displace portions of the lugs into the cell partition apertures are allowed unrestricted movement during the welding operation. Stated another way, the electrode tips are of sufficient length such that the body of the electrode does not come into contact with the lug during the welding operation. In this fashion, the electrode tips are allowed to continue to displace metal from the lug into the aperture during the entire welding operation. It is believed that this continued displacement of lug metal provides the most ideal condition for use in the welding process since unrestricted follow-up of the weld jaws is necessary in order to achieve high quality welds and no lead explusions.

In addition, with such smaller lugs and apertures, the welding operation should be preferably carried out such that the protusion of each of the electrode tips into the cell partition apertures is at least generally equal. Any substantial imbalance could result in unsatisfactory welds due to voids, blow-outs or the like. Stated another way, the relative pressures on each side of the weld should be such as to hold the molten metal in the desired location. The welding apparatus shown in FIGS. 10 through 13 provide one means for achieving welds with satisfactory characteristics when welding conditions are relatively sensitive, as when the lugs and cell partition apertures are smaller than in conventional designs.

When the welding conditions are no more sensitive than those encountered in welding intercell connections in conventional SLI batteries, the welding apparatus utilized can be any type capable of making welds satisfactory for the intended battery application. Many such welding techniques and apparatus are known, and it is contemplated that the welding apparatus incorporate a welding head comprising electrically actuated welding means adapted to engage and sequentially fuse or weld the lugs of both cells through-the partition by any means for electrically actuating the fusion or welding operation in a sequential manner for forming the multiple intercell connections adjacent each aperture.

Figure 11:
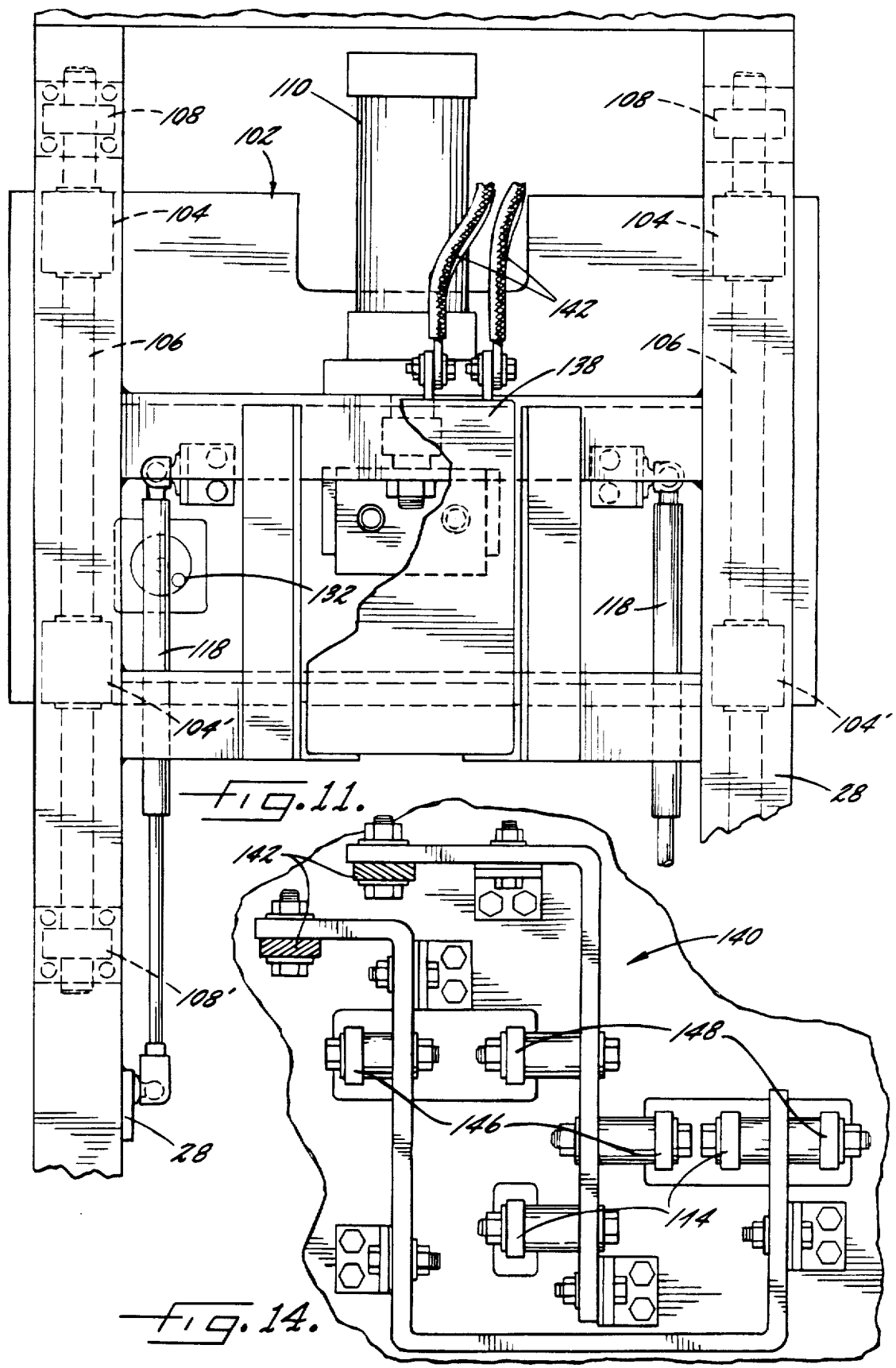
FIG. 11 is a cross-sectional view taken generally along the line 11—11 of FIG. 10 and further illustrates the carriage for the welding electrodes.

Turning now to the welding apparatus shown in FIGS. 10 through 13, the welding assembly at each station is mounted for movement relative to the battery container to bring the electrodes into position for the welding operation. As best seen in FIGS. 10 and 11, a welding subassembly shown generally at 102 for welding station 20 is mounted via bearing blocks 104, 104' to rod 106, which is in turn mounted on upstanding frame 28 by brackets 108, 108'. Cylinder 110 moves the welding subassembly into position in the battery container. The operative position for welding is determined by adjustable stop means 112 which seats on stub 114, which is, in turn, mounted on a shaft (shown in phantom). Stub 114 may accordingly be removed and replaced by one of a different size, as may be required when the size of the battery container being processed varies more than can be desirably accommodated by the fine tuning of adjustable stop means 112. Stop means 116 can be used to adjustably determine the upward, retracted position. If desired, means such as conventional gas springs 118 may be utilized to aid in the movement of the welding subassembly to its retracted position.

Figure 12:
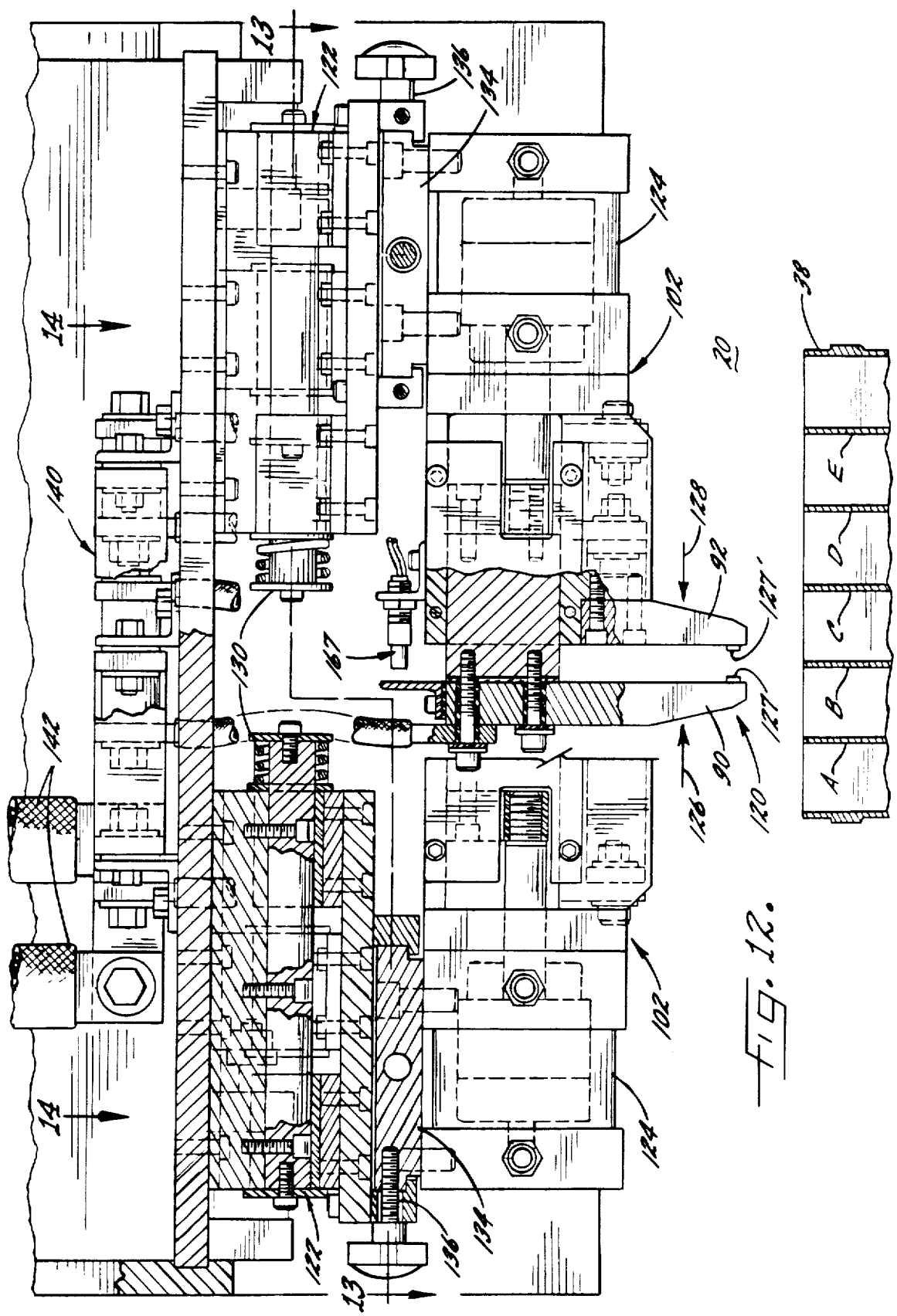
FIG. 12 is a cross-sectional view taken generally along the line 12—12 of FIG. 10 and showing the means for moving a pair of welding electrodes relative to one another.

As best shown in FIG. 10, the three sets of electrodes shown generally at 120 are mounted for slidable movement as generally shown at 122 so that the electrode pairs move to the desired position relative to one another for the welding operation. Referring to FIG. 12, electrode 90 is connected to cylinder 124 by any suitable means as shown. Actuation of the cylinder 124 moves electrode 90 inwardly in the direction of the arrow 126, causing electrode tip 127 to displace a portion of the lug into the cell partition aperture, a best seen in FIG. 8. Electrode 92 is generally fixed in position but is allowed movement as the resistance of the lugs 82 (FIGS. 7 and 8) cause the electrode pair to self-center, moving electrode 92 inwardly in the direction of arrow 128. Movement of electrode 90 as well is effected. Spring 130 (FIG. 12) associated with each electrode pair aids in returning the electrode pair to the proper location after completion of the welding operation. The action described likewise allows electrode tip 127' of electrode 90 to penetrate into the lug, displacing lug metal into the cell partition aperture (FIG. 8). It has been found that the relative penetration of electrode tips 127, 127' into the cell partition aperture in the illustrative apparatus is generally the same during the welding operation.

Moreover, as has been described herein, the electrode tips 127, 127' should be designed with sufficient length, when welding conditions may be more sensitive, such that movement into the cell partition aperture is not restricted by contact of the body of electrodes 90, 92 with the lugs 82, 88 (FIG. 8). While contact of the electrode tips can be avoided by controlling the time of the welding cycle, it may be desirable as a safety precaution to include means preventing physical contact of the electrode tips. This can be achieved, for example, by having the cylinder to which electrode 90 is attached bottom out prior to contact. Alternatively, conventional limit switches or the like may also be employed.

Adjustment means may be provided to allow relative movement of individual pairs of electrodes parallel to the cell partition so as to insure that the electrodes are in the proper location relative to lugs 82 and 88 for welding. In this fashion, each set of electrodes may be positioned in the precise location desired, should any fine tuning be required. Thus, as best shown in FIGS. 10 and 13, a handle 132 may be manually rotated to reposition block 134 which slides the electrodes relative to the aperture in the cell partition. Set screw 136 clamps block 134 in the desired position after adjustment.

The welding apparatus at welding stations 22 and 24 may be identical to that shown in FIGS. 10 through 13, and this is preferred. Of course, if desired, different apparatus could be used from one station to another.

In accordance with the illustrative embodiment, an electrode pair is provided for each intercell connection to be made in a single cell partition. This obviates the necessity for providing means to move the electrodes from one weld location to another. The necessary electrodes are simultaneously moved into position, allowing the intercell connections in a single partition to be rapidly effected.

Further, as can be seen, multiple intercell connections are made through each cell partition. It will generally be more desirable to sequentially weld the necessary intercell connections through a common cell partition since simultaneous welding may well result in somewhat uncertain welding conditions. However, even with completing one weld before the adjacent weld is started, the second welding operation should still result in a current path alternative to that desired. For this reason, and while the electrodes fairly efficiently direct the current in the desired path to effect the necessary weld, some dissipation will likely result. This could result in a weld of less than satisfactory properties being achieved. Moreover, such dissipation may have the effect of tightening processing parameters which increases the likelihood that, for example, either the initial weld will be over-welded or subsequent welds will be under-welded. Means are accordingly desirably provided which allow the welding conditions of each intercell connection being made to be individually controlled so as to compensate for any dissipation which may occur.

Satisfactory compensation can be provided either by designing the apparatus to provide such compensation or by the inclusion of suitable controls, or both. In the illustrative embodiment, as is best seen in FIGS. 10, 11 and 14, a transformer 138 is electrically connected to a bus bar shown generally at 140 by cables 142. By appropriate selection of the location on the bus bar for each set of electrodes, compensation can be designed into the system. Thus, the initial weld which will be carried out can be located with the longest current path from the transformer. The connections for the subsequent welds can then be positioned such that shorter current paths are provided which will inherently provide greater current for welding which may offset to some extent the dissipation effects caused by the initial weld. As shown in FIG. 14, the connections to bus bar 140 for the initial weld are located at connections 144, the connections for the middle electrode pair being shown at 146 and the connections for the last set of electrodes, positioned closest to the transformer, being shown at 148.

In accordance with the illustrative embodiment, the control means of this invention allow the compensation to be effected by individually varying the welding conditions for each intercell connection. This allows the welding parameters to be not only preset to take into account any compensation needed but also provides a means by which further adjustment, if needed, can be made during continued operation. Indeed, utilization of the control means provides an apparatus that is readily amenable to incorporation of weld testing means. The control means will be described in detail later.

Figure 15:
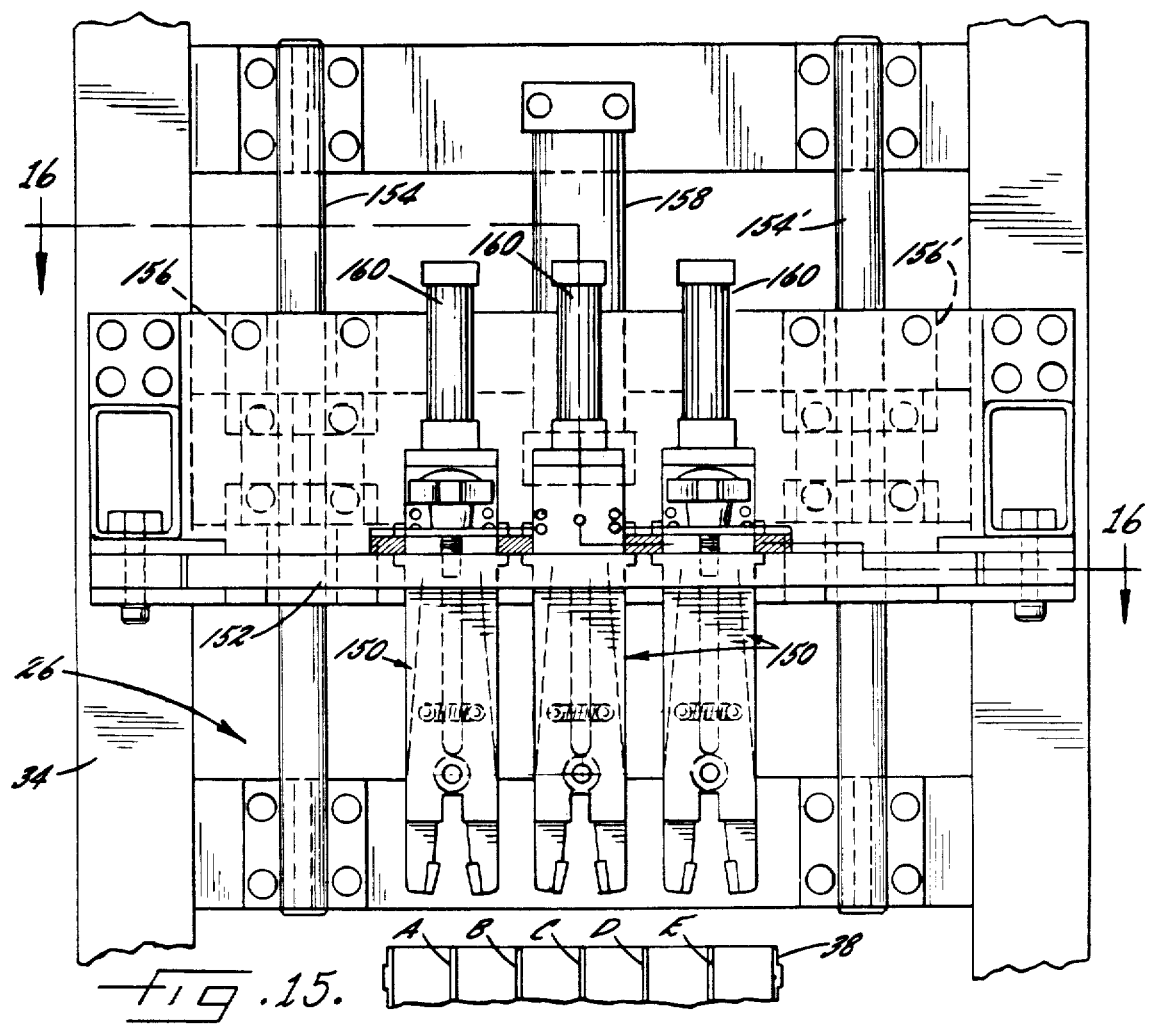
FIG. 15 is a side elevation view of the crimper station and illustrating the crimper heads in a retracted position.
Figure 16:
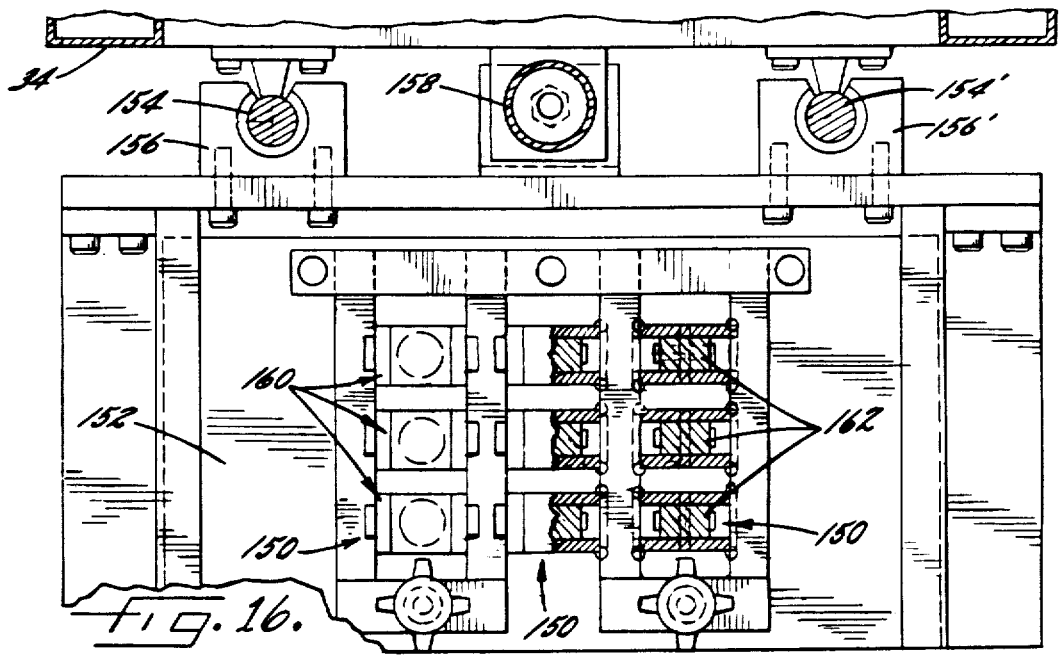
FIG. 16 is a cross-sectional view taken generally along the line 16—16 of FIG. 15 and showing the plate holding the crimper heads.

FIGS. 15 through 18 illustrate the optional crimping station 26. As seen in FIGS. 15 and 16, the crimping station 26 includes nine crimpers shown generally at 150 so that the welds in three cell positions can be simultaneously crimped. The crimpers 150 are attached to a plate member 152 which is mounted for slidable movement relative to the battery container by rods 154, 154', mounted in bearing blocks 156, 156'. Air cylinder 158 moves the crimpers into position in the battery container, upon actuation by the master control means through standard connections, adjustable stop means (not shown) being provided to insure the crimpers are in proper position.

After reaching the desired alignment in the battery container, the crimping action is effected by a hydraulic cylinder 160 driving member 162 downward, forcing the leg members 164, 164' of each crimper 150 outwardly and crimper heads 96, 96' inwardly, as can be seen from FIGS. 17 and 19. Springs 168 may be employed to assist in returning crimper heads 166, 166' to the open position shown in FIG. 17. Return of the crimpers to the retracted position shown in FIG. 15 may be effected by a spring (not shown) located in cylinder 160. The type of crimping operation shown is similar to that sometimes used in the intercell welding of conventional batteries.

In accordance with the present invention, as has been previously mentioned, a master-slave control system is provided which coordinates the entire operation of the apparatus. In general, the control means comprises a master control means and slave control means associated with one or more of the work stations. In the illustrative embodiment, a slave control means is associated with each welding station. Preferably, the master control means comprises a microprocessor-based programmable controller. Any microprocessor-based programmable controller capable of controlling the apparatus to provide the desired operation sequence may be employed. Many such controllers are commercially available, a suitable controller of this type being a Gould Modicon 484 Programmable Controller. Pursuant to this invention, the master controller is connected at least in part to the slave controller or controllers used through interface means, as will be described in more detail later. In addition, if desired, the master microprocessor-based controller may be connected to a manually operated, operator station. This system of controls not only allows the conditions for each weld or other work function to be those predetermined to be satisfactory but also allows an operator the ability to adjust conditions should this become desirable during operation. Moreover, with such control means, the apparatus is amenable to incorporation of testing means to provide an on stream method of insuring that the work function or functions are being satisfactorily carried out.

For example, several means for testing welds are known and may be employed, as desired. As one example, it may be useful to test the weld, based upon the spatial separation of the electrodes using a conventional LVDT device (linear variable differential transformer). As shown in FIG. 12, a LVDT device 167 can be employed to generate a signal to the master control means so that the welding operation is continued until a predetermined electrode separation considered to provide a satisfactory weld is reached. Alternatively, the weld test means could be used as a method of accepting or rejecting batteries through utilization of the control means.

Figure 20:
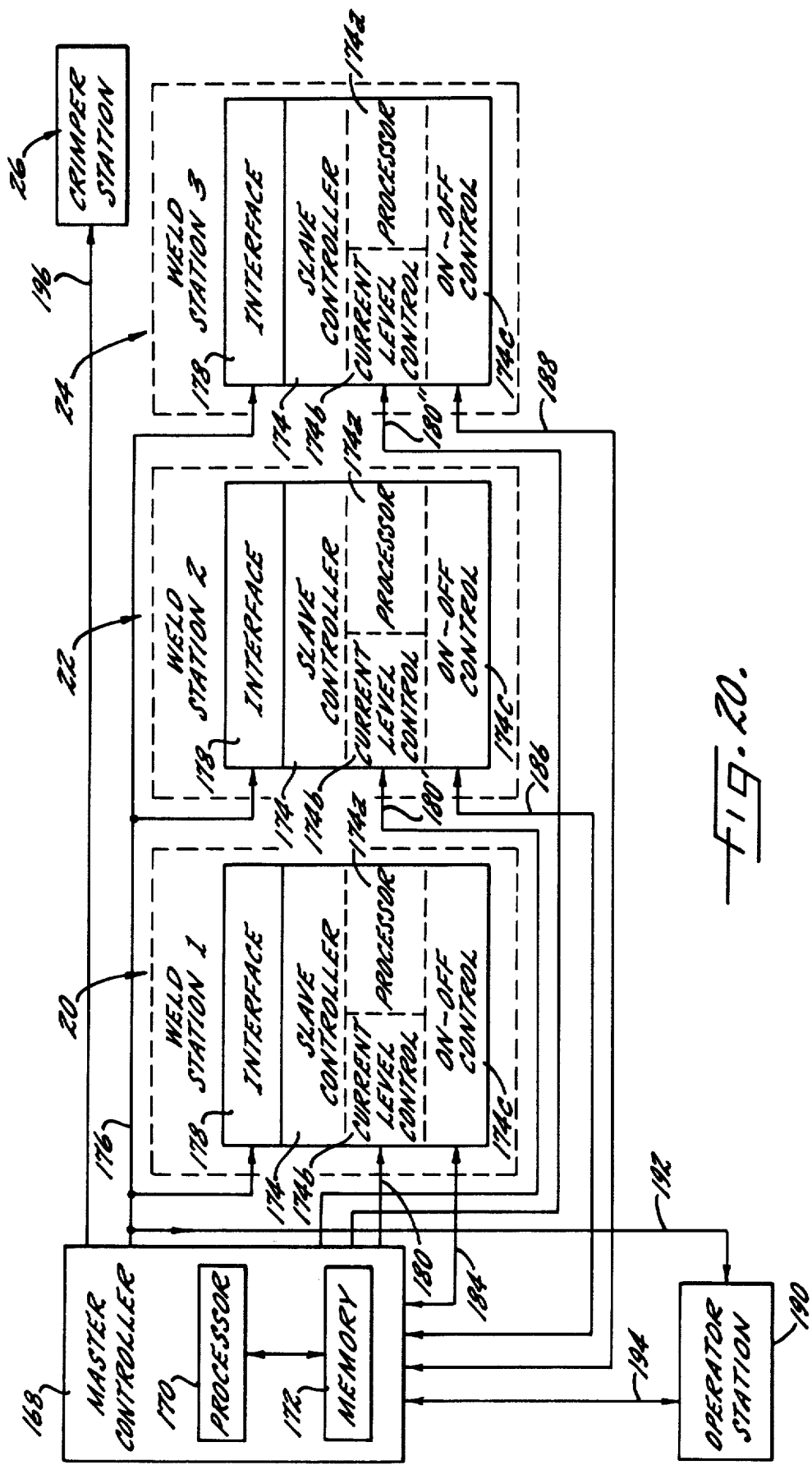
FIG. 20 is a simplified block diagram illustrating the coordination of the welding and crimping apparatus by the master-slave control system of this invention.

FIG. 20 schematically illustrates the overall control system of the present invention. As shown, the master control means comprises a Gould Modicon 484 Programmable Controller 168 having a processor portion 170 and a memory portion 172 which function in a conventional manner to control the operational elements of the present invention in the sequences which will be described hereinafter. Master controller 168 communicates with such operational elements through suitable input and output modules of conventional construction.

Each work station, a welding station in the embodiment shown, has associated therewith a slave controller 174, a commercially available Technitron welder control being suitable. This and other available types of welder controls are designed to control the welding sequence but are not designed to function as a slave control and are thus incapable of being directly controlled by the master controller. More particularly, in addition to having means for starting and stopping the work function, such controllers are designed to have the necessary parameter information manually inputted. Such controllers are thus not designed to have such parameter information automatically inputted.

In accordance with the present invention, as has been previously noted, the master controller is connected at least in part to the slave controller or controllers used through interface means. Such interface means allow the master controller to communicate with, and control, the otherwise incompatible controller serving as the slave controller. The interface means must be capable of accepting and storing the information for one parameter of the work function being controlled, as well as preventing transmission of such information to the slave controller other than when required as will be discussed later. Stated another way, in a broad sense, the interface means functions to automatically input the desired parameter information.

In accordance with the preferred embodiment of this invention, the interface means comprises a conventional tri-state buffered latch. This allows the master controller to provide one side of the latch with the desired parameter information which is stored until needed. The latch retains such information until the master controller initiates a signal to the on/off control portion of the slave controller, which, in turn, causes the slave controller to probe the interface means to obtain the parameter information. The latch remains in an inactive state, preventing transmission of such information, until probed by the slave controller pursuant to a signal from its on/off control portion, prompted by the signal from the master controller.

As may be appreciated, the interface means may comprise any other means capable of carrying out the functions achieved by the tri-state latch and discussed herein. Further, the interface means may include other components, if desired. In the illustrative embodiment, for example, it has thus been found necessary to include a conventional inverter due to the respective logic level of the signals involved.

When more than one parameter needs to be controlled, it is necessary to allow means capable of distinguishing the information of one parameter from another. This can be accomplished by employing a separate interface means for each parameter of the work function being controlled.

Alternatively, and as shown in the illustrative embodiment, the information for one parameter may be directly transmitted from the master controller to the on/off control portion of the slave controller. Using such a parallel signal path allows the information for the latter parameter to be modified while the apparatus is in operation. This may be particularly useful in applications such as welding where testing means for the work function are included. For example, this would allow a particular weld to, in effect, be further processed if the weld test information indicated such would be desirable.

As shown in FIG. 20, master controller 168 is connected to each slave controller 174 via line 176 which carries a multiplex, digital signal that includes the time or cycle information and interface 178 having a conventional tri-state buffered latch and an inverter. Only the information applicable to the particular welding station is taken from the multiplex signal, as may be accomplished by known techniques. Each slave controller 174 consists of a microprocessor portion 174a, a current level control portion 174b and an on/off control portion 174c. Lines 180, 180' and 180" connect master controller with the current level control portion 174b of slave controllers 174 at each welding station to allow an analog signal that conveys the weld current parameter information.

Master controller 168 is likewise connected to the on/off control portion 174c of slave controllers 174 via lines 184, 186 and 188 to allow a signal to such control portion to initiate the welding operation and, as well, a signal to the master controller when the operation is complete. The on/off control portion 174c thus functions to turn the power supply for the welding on and off pursuant to the parameters provided by master controller 168.

In addition, an operator station 190 of conventional design is provided which is connected to master controller 168 via lines 192 and 194. This allows an operator to manually vary the weld parameters being used, if such is needed, after all the welds in a particular partition have been completed. The operator station includes a visual display of the current level and cycles for each of the electrode pairs. Master controller 168 is also connected to the crimper station by standard machine connection, as shown at 196.

Considering the overall machine sequence of the illustrative embodiment, the transporting of battery containers through the apparatus is controlled by the control system as follows. Unless otherwise indicated herein, the master control means are connected to the various operational elements of the apparatus through standard machine connections. With the conveyor having been started up, the master control means in a timed sequence causes the stop means to rotate into position, activates the aligning means (after a wait period adequate to allow the containers to reach the next position so as to retain the containers in such position) and then stops the conveyor motor. The photoeyes then sense whether the battery containers at the respective stations are each in their proper location. This sequence occurs at each welding and crimping station essentially simultaneously. If the containers have been sensed as being properly located, the respective welding and crimping heads are caused to be lowered to their operational position.

The welding and crimping sequences are then carried out. After completion of these steps, the heads are raised to their retracted position, generating a signal to the master controller. If the retracted, up position signal is not received, no further operational sequences will occur, the entire apparatus going, in effect, to a wait cycle; and a control light or alarm may be provided to alert the operator. When the heads have been identified as being in the retracted position, the aligning means are retracted, the machine direction stop means are rotated to the next sequence, the conveyor motor is started, a waiting period again being provided to allow the containers to reach the next position. The sequence is then repeated.

In the above sequence, if the presence of a battery container is not detected, the operation at that station will not proceed. Each station operates independently of one another so that the absence of a container at one station only disables the function at that particular station, except at the first position of weld station No. 1 as will be described hereinafter. The disabling is achieved by the master controller generating a waiting period and a cycle complete.

The principal purpose of avoiding initiation of the welding or crimping sequence if a battery container is not properly aligned is simply to prevent damage to either the container itself or to the apparatus, but more usually to the container. Thus, for example, a misaligned container could result in the welding heads deforming the container as the heads are lowered so that the container itself would have to be scraped. This is, however, primarily a safety factor. Once a battery container reaches the proper position in the initial position of the first welding station, there is little likelihood that any problems in the container being misaligned downstream will in fact occur.

However, it is more difficult to control entry into the welding apparatus so that in-line feeding problems can cause a battery container to not reach the initial station in a timely fashion. Accordingly, the microprocessor-based master controller is preferably programmed to inactivate the downstream welding and crimping stations when the container reaches the initial position in the first welding station too late to be sensed as being properly located. Thus, if any in-feeding problems occur, the container will not be only partially welded. Rather, the master controller is programmed to, in effect, generate cycle complete signals as that late container proceeds through the apparatus. This avoids interruption of the machine sequence to manually operate a particular station to complete a partially processed battery. While such an operation certainly could be done, or, indeed, the necessary welds completed in a manual fashion, this would detract from the production rates that could otherwise be achieved. Late containers can be returned to the feeding sequence, manually or otherwise.

With regard to the welding sequence, after the master controller receives a signal that a battery is present, this controller transmits the welding parameter information to the slave controllers for the welding stations as has been described in conjunction with FIG. 20. Inasmuch as conditions of the lugs being welded can vary (e.g.—the time between the casting of the strap and the intercell welding), necessitating changes in the current and time needed to effect a satisfactory weld, it is preferred to carry out the welding sequence with what may be termed a pre-heat or pre-weld cycle, followed by the welding cycle.

Accordingly, in such an embodiment, after sensing that the battery container is in proper position, the initial information transmitted by the master controller to the slave controllers is the pre-heat time and current information for the initial weld. In general, the pre-heat cycle softens the lugs so as to allow the electrode tips to readily penetrate the lugs during welding, regardless of their initial hardness. After transmission, a waiting period is provided to allow satisfactory time for the welding electrode heads to close. At this point, the master controller signals the on/off control portion 174c of the slave controller to start the pre-heat cycle. Completion of the pre-heat step is then transmitted by such control portion to the master controller. If the pre-heat signal complete is not received, no further operational sequences will be initiated; rather, the apparatus will go into a waiting sequence until an operator can correct whatever malfunction may have occurred.

After the master controller receives the pre-heat complete signal, the master controller then transmits to the slave controller the weld parameter information for such first weld. The master controller likewise then signals the on/off control portion 174c of the slave controller to start the welding cycle. The slave controller signals the master controller when the weld cycle is complete. If no such signal is received, the apparatus will go into a wait cycle, as previously discussed.

At this time, the master controller then transmits to the slave controller the pre-heat cycle information for the second weld, and the sequence is then repeated. This is then repeated for, when used, the third or further welds, after which time the master controller initiates the sequence described above to index the containers to the next position.

In accordance with yet another aspect of one embodiment of the present invention, means are provided to allow one parameter of the work function to be altered while the work function is being carried out. The master controller provides to the slave controller the time parameter (cycles) for the pre-heat and weld cycles in the form of a digital signal which is captured by the microprocessor portion 174a of the slave controller so that it cannot be modified while the cycle is being carried out. The current level signal, however, in the form of an analog signal, is transmitted directly to the current level control portion 174b of the slave controller so that it is not captured by the microprocessor portion 174a of the slave controller. This provides the capability for automatic adjustment of the current level while the welding operation is taking place. For example, this may be achieved by including a weld testing means which transmits a signal indicative of the welding operation taking place to the master controller which, in turn, can modify the current level accordingly if needed to insure the desired weld quality.

As can thus be seen, the present invention provides a control system which utilizes as a slave control a controller tailored to control a particular work function upon manual inputting of the desired parameter information but incapable of being used by design as an automatic slave controller. By inclusion of a suitable interface means such a controller is made to function as an automatic slave controller.

I claim:

1. An apparatus for controlling a work function requiring the control of at least two parameters in a predetermined sequence which comprises:
   (a) at least one work station having means for carrying out said work function;
   (b) a slave control means for controlling the work function at said work station in a predetermined sequence;
   (c) at least one interface means electronically connected to said slave control means for receiving and storing information for a first parameter of said work function, said interface means preventing transmission of said parameter information to said slave control means until being probed by said slave control means;
   (d) a master control means electronically connected to said interface means to transmit said first parameter information to said interface means; said master control means being further electronically connected to said slave control means to cause said slave control means to probe said interface means and receive said first parameter information from said interface means; said slave control means controlling said work function in said predetermined sequence upon receiving said first parameter information;
   (e) means for storing information for a second parameter of said work function, said master control means being further electronically connected to said slave control means to allow transmission of said information for a second work function parameter via a signal distinguishable from the first parameter information;
   (f) said master control means comprising a microprocessor-based programmable control and said slave control means comprising a microprocessor portion and a control portion; and
   (g) said first parameter information is received by said microprocessor portion of said slave control means and said second parameter information is received by said control portion of said slave control means.

2. The apparatus of claim 1, wherein said master control means transmits the first parameter information by a digital signal and the second parameter information by an analog signal.

3. The apparatus of claim 2, wherein the work function being controlled is a welding operation.

4. The apparatus of claim 3, wherein said work function is a welding function and said first parameter is a weld time and said second parameter is a weld current.

5. The apparatus of claim 1, wherein multiple work stations are provided, each of said stations having a slave control means associated with said station.

6. The apparatus of claim 5, wherein said master control means is a microprocessor-based programmable controller and said first parameter information is transmitted by a multiplex, digital signal.

7. The apparatus of claim 1, wherein said interface means comprises a tri-state buffered latch.

8. The apparatus of claim 7, wherein said interface means includes an inverter for converting the logic levels of the signal transmiting said parameter information to said slave control means.

9. The apparatus of claim 1 which includes an operator station electronically connected to said master control means, said operator station including a means for visually displaying the parameter information and means for modifying said parameter information.

10. The apparatus of claim 1, wherein the work function being controlled is a welding operation.

11. The apparatus of claim 1 which includes a second interface means electronically connected to said slave control means for receiving and storing information for said second parameter of said work function, said second interface means preventing transmission of said second parameter information to said slave control means until being probed by said slave control means, said second interface means being further electronically connected to said master control means.

12. A method of controlling a work function requiring the control of at least two parameters in a predetermined sequence which comprises:
   (a) providing at least one work station for carrying out said work function;
   (b) providing a slave control with a microprocessor portion and a control portion for controlling said work function at said work station in a predetermined sequence;
   (c) providing an interface electronically connected to said slave control for receiving and storing information for a first parameter of said work function, said interface preventing transmission of said parameter information to said slave control until being probed by said slave control;
   (d) providing means for storing information for a second parameter of said work function;
   (e) providing a master control electronically connected to said interface for transmitting said first parameter information to said interface;
   (f) transmitting said first parameter information to said interface;
   (g) signalling the slave control to start the work function;
   (h) probing the interface to permit transmission of said first parameter information to said microprocessor portion of said slave control;
   (i) carrying out said work function pursuant to said first parameter information;
   (j) transmitting said second parameter information to the control portion of said slave control;
   (k) carrying out said work function pursuant to said second parameter information; and
   (l) signalling said master control when said work function is completed.

13. The method of claim 12, wherein the work function being controlled is a welding operation.

14. The method of claim 13, wherein first parameter is a weld time and said second parameter is a weld current.

* * * * *

UNITED STATES PATENT AND TRADEMARK OFFICE
CERTIFICATE OF CORRECTION

PATENT NO.   : 4,497,019
DATED        : January 29, 1985
INVENTOR(S)  : Glenn R. Waber It is certified that error appears in the above-identified patent and that said Letters Patent are hereby corrected as shown below:

On the title page;
First page (abstract page), delete: "Related U.S. Application Data (63) Continuation-in-part of Ser. No. 245,772, Mar. 20, 1981."

Signed and Sealed this

Sixth Day of August 1985

[SEAL]

Attest:

DONALD J. QUIGG

*Attesting Officer*   Acting Commissioner of Patents and Trademarks